United States Patent [19]

Fujimoto et al.

[11] Patent Number: 5,162,181
[45] Date of Patent: Nov. 10, 1992

[54] ELECTROPHOTOGRAPHIC PHOTORECEPTOR HAVING A BISAZO PHOTORECEPTIVE LAYER

[75] Inventors: Shingo Fujimoto, Hino; Toyoko Shibata, Zama; Osamu Sasaki, Hachioji, all of Japan

[73] Assignee: Konica Corporation, Tokyo, Japan

[21] Appl. No.: 668,057

[22] Filed: Mar. 12, 1991

[30] Foreign Application Priority Data

Mar. 14, 1990 [JP] Japan .................................. 2-63613

[51] Int. Cl.$^5$ .............................................. G03G 5/06
[52] U.S. Cl. ........................................ 430/58; 430/73; 430/76
[58] Field of Search ............ 430/72, 58, 59, 75, 430/76, 79; 534/658

[56] References Cited

U.S. PATENT DOCUMENTS

| | | | |
|---|---|---|---|
| 3,871,882 | 3/1975 | Wiedemann | 430/72 |
| 4,939,058 | 7/1990 | Shibata et al. | 430/79 |

*Primary Examiner*—John Goodrow
*Attorney, Agent, or Firm*—Finnegan, Henderson, Farabow, Garrett and Dunner

[57] ABSTRACT

There is disclosed the electrophotographic photoreceptor having a high sensitivity and a low residual potential as well as an excellent durability in repeated use. The photoreceptor comprises a photoreceptive layer containing the bisazo compound represented by the following Formula I:

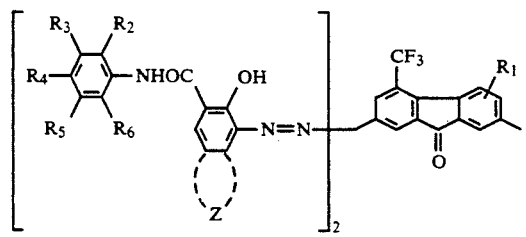

wherein $R_1$ represents a hydrogen atom, a nitro group, a cyano group, an alkyl group, or an alkoxy group; Z represents the group of non-metal atoms necessary to form an aromatic hydrocarbon ring or an aromatic heterocyclic ring by condensation with benzene ring; and $R_2$ to $R_6$ each represent a hydrogen atom, a halogen atom, a cyano group, a nitro group, an alkyl group, and an alkoxy group.

15 Claims, 1 Drawing Sheet

ELECTROPHOTOGRAPHIC PHOTORECEPTOR HAVING A BISAZO PHOTORECEPTIVE LAYER

FIELD OF THE INVENTION

The present invention relates to an electrophotographic photoreceptor, more specifically to a photoreceptor having a photoreceptive layer containing a specific bisazo compound.

BACKGROUND OF THE INVENTION

There has so far been widely used an inorganic electrophotographic photoreceptor having a photoreceptive layer containing the main component of inorganic photoconductive compounds such as selenium, zinc oxide, cadmium sulfide and silicon. However, these compounds are not necessarily satisfactory in sensitivity, heat stability, moisture resistance and durability. The photoreceptor comprising selenium, for example, lowers in photoreceptive properties due to crystallization, which makes its manufacture troublesome. Further, heat and fingerprints cause crystallization of selenium to deteriorate its photoreceptive properties. Cadmium sulfide has also problems in moisture resistance and durability, and zinc oxide in durability.

In order to solve these problems involved in inorganic photoreceptors, organic photoreceptors have been actively researched and developed in recent years, in which organic photoconductive compounds are incorporated into a photoreceptive layer as the principal ingredient. Japanese Patent Examined Publication No. 10496/1975 discloses an organic photoreceptor containing poly-N-vinylcarbazole and 2,4,7-trinitro-9-fluorenone, but this photoreceptor is not necessarily satisfactory in sensitivity and durability.

For the purpose of solving these problems, the development of an organic photoreceptor having higher quality has been attempted, in which carrier generation and carrier transport functions are separately provided by different substances. Such function-separating photoreceptors have advantages that the materials for respective functions can be selected from a wide range of compounds to thereby prepare photoreceptors of prescribed properties with ease. For this reason, various types of the function-separating photoreceptors have been studied, and some of them are already commercially available.

Multilayered photoreceptors of this type is described in U.S. Pat. No. 3,871,882, in which perylene derivatives are used for a carrier generation layer and oxadiazole derivatives for a carrier transport layer; and in Japanese Patent Publication Open to Public Inspection (hereinafter referred to as JP O.P.I.) No. 84943/1980, in which distyrylbenzene-type bisazo compounds are used for a carrier generation layer and hydrazone compounds for a carrier transport layer.

These function-separating photoreceptors have various disadvantages as well as many advantages.

There have been proposed a variety of compounds as a carrier generation substance for the above photoreceptors, including amorphous selenium used in combination with organic photoconductive compounds as disclosed in Japanese Patent Examined Publication No. 16198/1968, while this method does not solve the problem that the carrier generation layer comprising amorphous selenium tends to crystallize on heating to thereby deteriorate in photoreceptive properties.

Further, there are proposed many photoreceptors in which organic dyes and organic pigments are used as carrier generation substances, including photoreceptors containing bisazo compounds as disclosed in JP O.P.I. No. 22834/1979, 73057/1980, 117151/1980 and 46237/1981, while these compounds do not fully meet various requirements in electrophotography because carrier transfer substances have to be limitedly selected for providing prescribed characteristics.

SUMMARY OF THE INVENTION

The first object of the present invention is to provide an electrophotographic photoreceptor containing a specific bisazo compound excellent in carrier generation ability.

The second object is to provide a photoreceptor having a high sensitivity and a low residual potential as well as excellent durability in repeated use.

The third object is to provide a photoreceptor containing a bisazo compound which can be used in combination with a wide range of carrier transfer substances to work effectively as a carrier generation substance.

The above objects can be achieved by an electrophotographic photoreceptor comprising a conductive support and provided thereon a photoreceptive layer containing a bisazo compound represented by the following Formula 1:

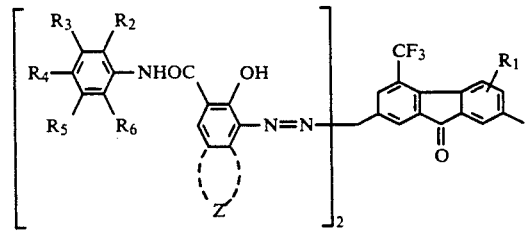

wherein $R_1$ represents a hydrogen atom, a nitro group, a cyano group, an alkyl group, or an alkoxy group; Z represents the group of non-metal atoms necessary to condense with a benzene ring to form an aromatic hydrocarbon ring or aromatic heterocycle; and $R_2$ to $R_6$ represent independently a hydrogen atom, a halogen atom, a cyano group, a nitro group, an alkyl group, and an alkoxy group.

Figure 1:
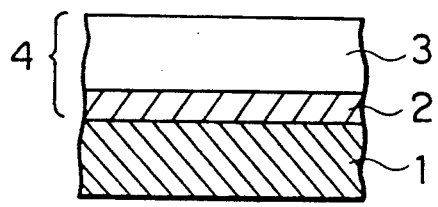
FIGS. 1 to 6 are sectional drawings illustrating the layer structures of the photoreceptors.
Figure 4:
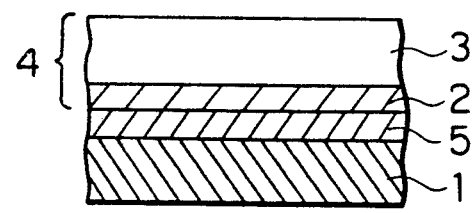

1 ... a conductive support
2 ... a carrier generation layer
3 ... a carrier transport layer
4 ... a photoreceptive layer
5 ... an intermediate layer

DETAILED DESCRIPTION OF THE INVENTION

In Formula 1, the alkyl group represented by $R_1$ has preferably 1 to 4 carbon atoms. The preferred examples thereof are methyl, ethyl, isopropyl and t-butyl. The alkoxy group represented by $R_1$ has preferably 1 to 4 carbon atoms. The preferred examples thereof are methoxy, ethoxy, isopropoxy and t-butoxy.

The examples of the aromatic hydrocarbon ring formed by Z are a naphthalene ring and an anthracene ring. The examples of the aromatic heterocycle are carbazole, benzocarbazole, dibenzofuran, diphenylsulfide, and benzonaphthofuran.

The alkyl groups represented by $R_2$ to $R_6$ have preferably 1 to 4 carbon atoms. The preferred examples thereof are methyl, ethyl, isopropyl, t-butyl and trifluoromethyl. The alkoxy groups represented by $R_2$ to $R_6$ have preferably 1 to 4 carbon atoms. The preferred examples thereof methoxy, ethoxy and t-butoxy.

Preferred is the compound represented by Formula 1 in which $R_1$ is hydrogen.

The examples of the bisazo compounds represented by Formula 1 are shown below:

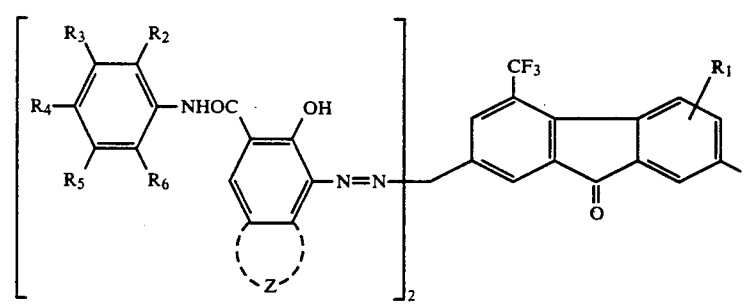

| No. | Z | $R_1$ | $R_2$ | $R_3$ | $R_4$ | $R_5$ | $R_6$ |
|---|---|---|---|---|---|---|---|
| G-1 | benzene | H | H | H | H | H | H |
| G-2 | benzene | H | CH$_3$ | H | H | H | H |
| G-3 | benzene | H | H | CH$_3$ | H | H | H |
| G-4 | benzene | H | H | H | CH$_3$ | H | H |
| G-5 | benzene | H | Cl | H | H | H | H |
| G-6 | benzene | H | H | Cl | H | H | H |
| G-7 | benzene | H | H | H | Cl | H | H |
| G-8 | benzene | H | Br | H | H | H | H |

-continued
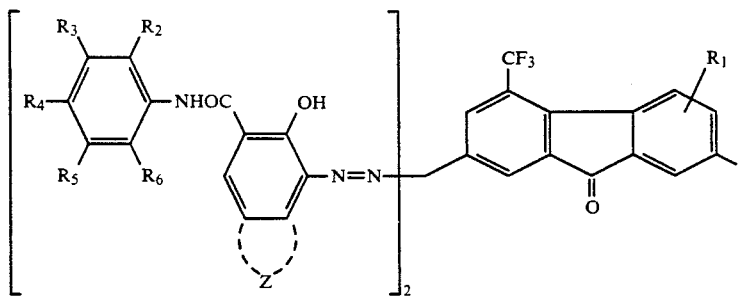
| No. | Z | R₁ | R₂ | R₃ | R₄ | R₅ | R₆ |
|---|---|---|---|---|---|---|---|
| G-9 | phenyl | H | H | Br | H | H | H |
| G-10 | phenyl | H | H | H | Br | H | H |
| G-11 | phenyl | H | OCH₃ | H | H | H | H |
| G-12 | phenyl | H | H | OCH₃ | H | H | H |
| G-13 | phenyl | H | H | H | OCH₃ | H | H |
| G-14 | phenyl | H | H | H | NO₂ | H | H |
| G-15 | phenyl | H | NO₂ | H | H | H | H |
| G-16 | phenyl | H | H | NO₂ | H | H | H |
| G-17 | phenyl | H | H | H | CN | H | H |

-continued
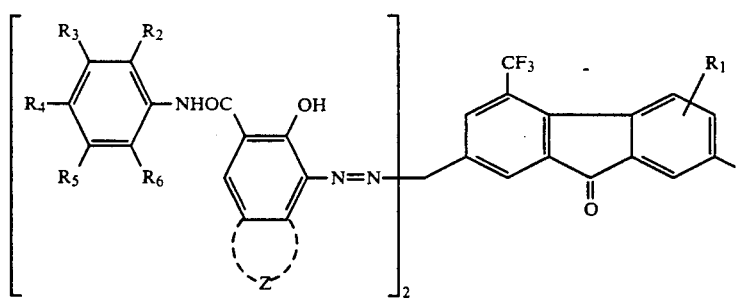
| No. | Z | $R_1$ | $R_2$ | $R_3$ | $R_4$ | $R_5$ | $R_6$ |
|---|---|---|---|---|---|---|---|
| G-18 | | H | CN | H | H | H | H |
| G-19 | | H | H | CN | H | H | H |
| G-20 | | H | $CF_3$ | H | H | H | H |
| G-21 | | H | H | $CF_3$ | H | H | H |
| G-22 | | H | H | H | $CF_3$ | H | H |
| G-23 | | H | F | H | H | H | H |
| G-24 | | H | H | F | H | H | H |
| G-25 | | H | H | H | F | H | H |
| G-26 | | H | H | $C_2H_5$ | H | H | H |

-continued
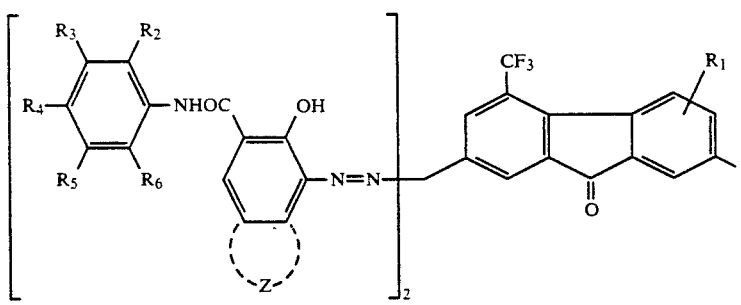
| No. | Z | R₁ | R₂ | R₃ | R₄ | R₅ | R₆ |
|---|---|---|---|---|---|---|---|
| G-27 | benzene | H | H | H | OC$_2$H$_5$ | H | H |
| G-28 | benzene | H | H | Cl | H | Cl | H |
| G-29 | benzene | H | CH$_3$ | H | CH$_3$ | H | H |
| G-30 | benzene | H | CH$_3$ | H | Cl | H | H |
| G-31 | benzene | H | Cl | H | H | NO$_2$ | H |
| G-32 | benzene | H | H | CF$_3$ | H | CF$_3$ | H |
| G-33 | benzene | H | Cl | H | CH$_3$ | H | H |
| G-34 | benzene | H | Cl | H | Cl | H | H |
| G-35 | benzene | H | Cl | H | H | Cl | H |

-continued
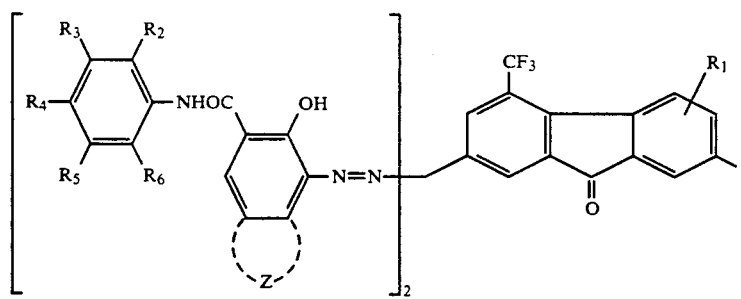
| No. | Z | R₁ | R₂ | R₃ | R₄ | R₅ | R₆ |
|---|---|---|---|---|---|---|---|
| G-36 | 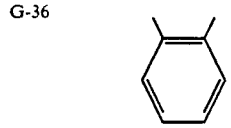 | H | H | CF$_3$ | Cl | H | H |
| G-37 | 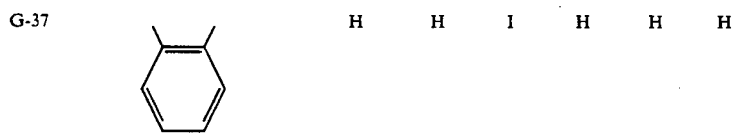 | H | H | I | H | H | H |
| G-38 | 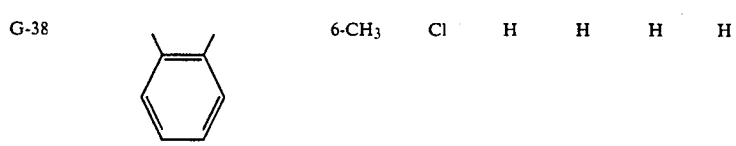 | 6-CH$_3$ | Cl | H | H | H | H |
| G-39 | 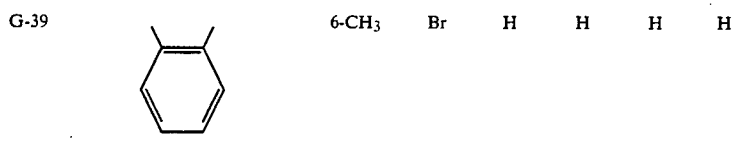 | 6-CH$_3$ | Br | H | H | H | H |
| G-40 | 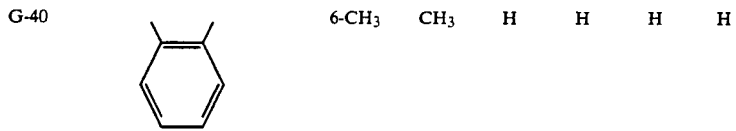 | 6-CH$_3$ | CH$_3$ | H | H | H | H |
| G-41 | 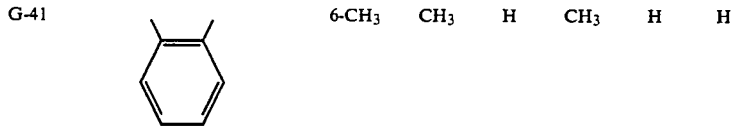 | 6-CH$_3$ | CH$_3$ | H | CH$_3$ | H | H |
| G-42 | 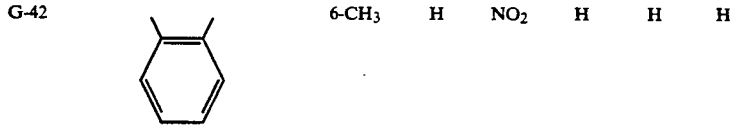 | 6-CH$_3$ | H | NO$_2$ | H | H | H |
| G-43 | 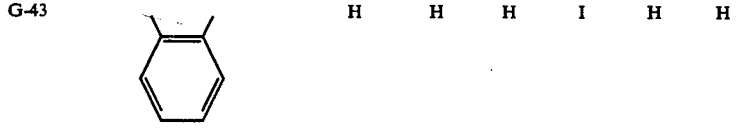 | H | H | H | I | H | H |
| G-44 | 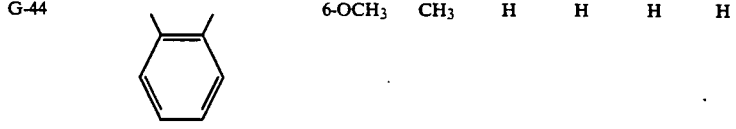 | 6-OCH$_3$ | CH$_3$ | H | H | H | H |

-continued
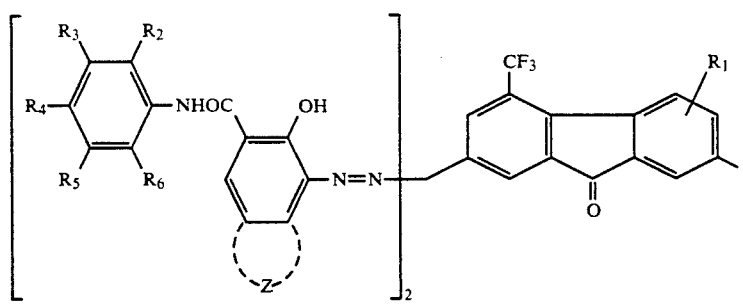
| No. | Z | $R_1$ | $R_2$ | $R_3$ | $R_4$ | $R_5$ | $R_6$ |
|---|---|---|---|---|---|---|---|
| G-45 | phenyl | 6-OCH$_3$ | Cl | H | H | H | H |
| G-46 | phenyl | 6-OCH$_3$ | Br | H | H | H | H |
| G-47 | phenyl | 6-OCH$_3$ | H | CF$_3$ | H | H | H |
| G-48 | phenyl | 6-OCH$_3$ | CH$_3$ | H | CH$_3$ | H | H |
| G-49 | phenyl | H | H | C$_3$H$_7$ | H | H | H |
| G-50 | phenyl | 6-NO$_2$ | CH$_3$ | H | CH$_3$ | H | H |
| G-51 | phenyl | 6-NO$_2$ | CH$_3$ | H | H | H | H |
| G-52 | phenyl | 6-NO$_2$ | Cl | H | H | H | H |
| G-53 | phenyl | 6-NO$_2$ | Br | H | H | H | H |

-continued
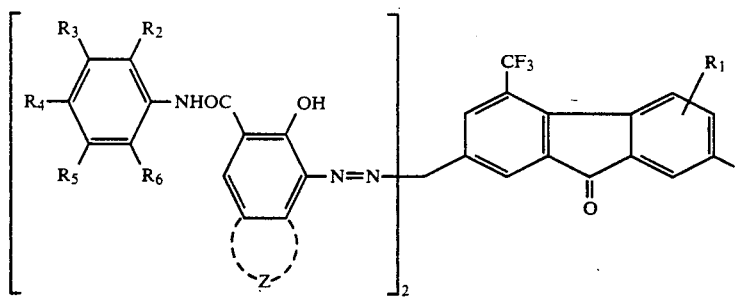
| No. | Z | R₁ | R₂ | R₃ | R₄ | R₅ | R₆ |
|-----|---|-----|-----|-----|-----|-----|-----|
| G-54 | (benzene) | 6-NO$_2$ | H | NO$_2$ | H | H | H |
| G-55 | (benzene) | H | H | H | OC$_3$H$_7$ | H | H |
| G-56 | (benzene) | 6-CN | Cl | H | I | H | H |
| G-57 | (benzene) | 6-CN | Br | H | H | H | H |
| G-58 | (benzene) | 6-CN | CH$_3$ | H | CH$_3$ | H | H |
| G-59 | (benzene) | 6-CN | H | NO$_2$ | H | H | H |
| G-60 | (benzene) | 6-CN | H | CF$_3$ | H | H | H |
| G-61 | (carbazole) | H | H | H | H | H | H |

-continued
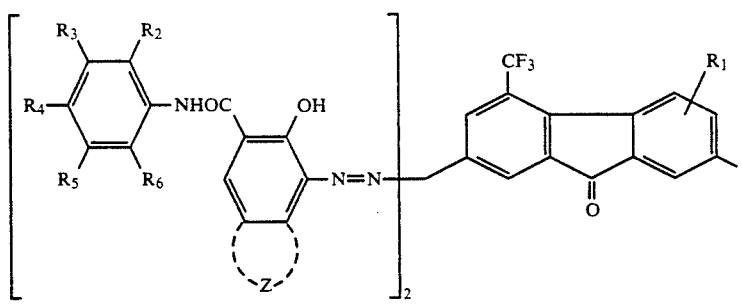
| No. | Z | R₁ | R₂ | R₃ | R₄ | R₅ | R₆ |
|---|---|---|---|---|---|---|---|
| G-62 | 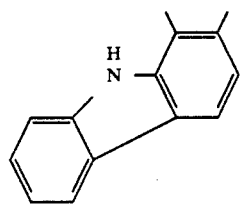 | H | Cl | H | H | H | H |
| G-63 | 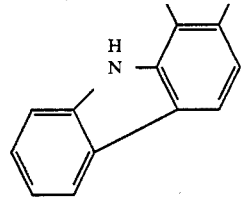 | H | CH₃ | H | CH₃ | H | H |
| G-64 | 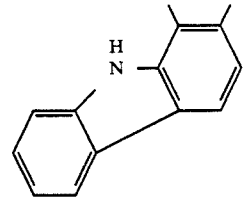 | H | CH₃ | H | H | H | H |
| G-65 | 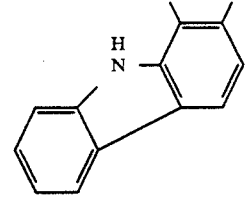 | H | H | NO₂ | H | H | H |
| G-66 | 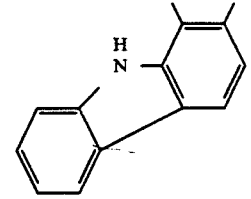 | H | Br | H | H | H | H |
| G-67 | 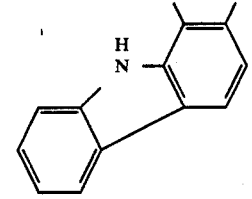 | H | H | C₂H₅ | H | H | H |

-continued
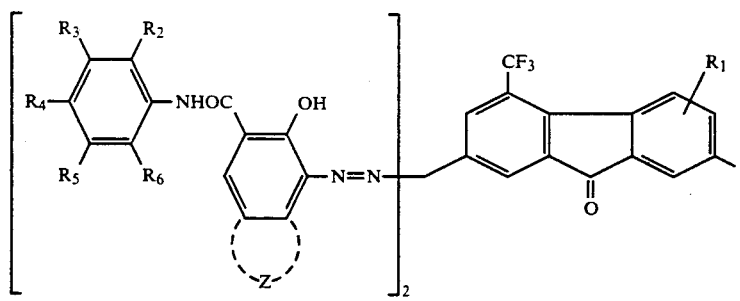
| No. | Z | R₁ | R₂ | R₃ | R₄ | R₅ | R₆ |
|---|---|---|---|---|---|---|---|
| G-68 | 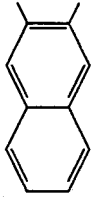 | H | H | H | H | H | H |
| G-69 | 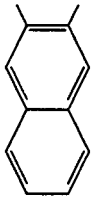 | H | Cl | H | H | H | H |
| G-70 | 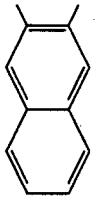 | H | Br | H | H | H | H |
| G-71 | 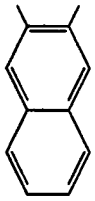 | H | CH₃ | H | CH₃ | H | H |
| G-72 | 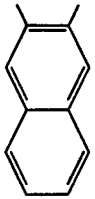 | H | H | NO₂ | H | H | H |

-continued
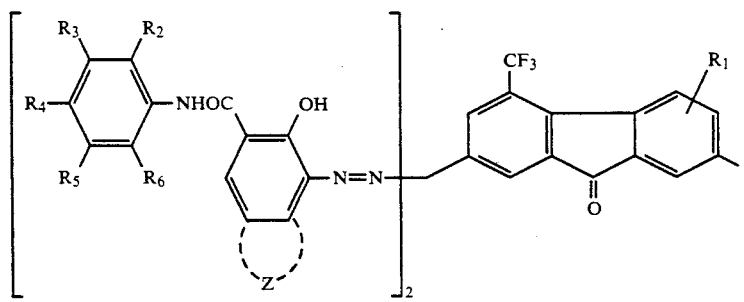
| No. | Z | R₁ | R₂ | R₃ | R₄ | R₅ | R₆ |
|---|---|---|---|---|---|---|---|
| G-73 | benzofuran | H | H | H | H | H | H |
| G-74 | benzofuran | H | H | CF$_3$ | H | H | H |
| G-75 | benzofuran | H | Cl | H | H | H | H |
| G-76 | benzofuran | H | CH$_3$ | H | CH$_3$ | H | H |
| G-77 | benzofuran | H | CH$_3$ | H | H | H | H |

-continued

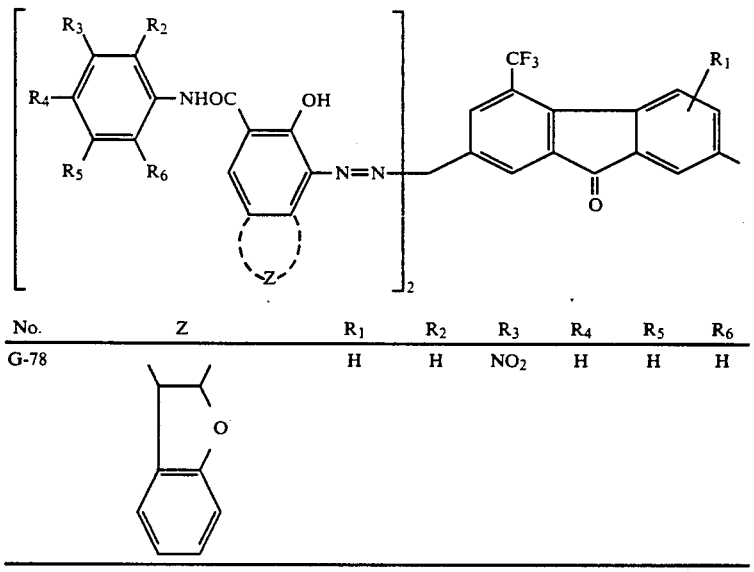

| No. | Z | R₁ | R₂ | R₃ | R₄ | R₅ | R₆ |
|---|---|---|---|---|---|---|---|
| G-78 | (structure) | H | H | NO$_2$ | H | H | H |

The bisazo compounds represented by Formula 1 can be prepared by known methods.

Synthesis 1 (Compound No. G-1)

The solution dissolving 1.4 g (0.02 mol) of sodium nitrite in 5 ml of water was added dropwise to the mixture in which 2.78 g (0.01 mol) of 2,7-diamino-4-trifluoromethyl-9-fluorenone were dispersed in 10 ml of hydrochloric acid and 20 ml of water, while keeping the temperature at below 5° C. After stirring for 1 hour at the same temperature, insoluble matters were filtered off, and then the solution dissolving 4.6 g of ammonium hexafluorophosphate in 50 ml of water was added to the filtrate. The precipitated tetrazonium salt was filtered and dissolved in 100 ml of N,N-dimethylformamide (DMF). While keeping the temperature at below 5° C., there was added dropwise thereto the solution dissolving 5.26 g (0.02 mol) of 2-hydroxy-3-naphthoic anilide in 200 ml of DMF.

Subsequently, the solution dissolving 6 g (0.04 mol) of triethanolamine in 30 ml of DMF was added dropwise at below 5° C., and stirring was continued for 1 hour at below 5° C. and for another 4 hours at a room temperature. After completion of the reaction, the precipitated crystals were filtered, washed with DMF and water and dried to thereby obtain 6.23 g of the compound.

The elemental analysis of this compound showed that the measured values of carbon, hydrogen and nitrogen were 70.1%, 3.42% and 10.8%, respectively, while the theoretical values thereof are 69.7%, 3.51% and 10.2%, respectively.

Synthesis 2 (Compound No. G-6)

Bisazo compound G-6 was synthesized in the same manner as in Synthesis 1, except that 2-hydroxy-3-naphthoic anilide was replaced with equimolar 2-hydroxy-3-naphthoic acid-3'-chloro anilide.

The elemental analysis of this compound showed that the measured values of carbon, hydrogen and nitrogen were 65.0%, 3.01% and 9.50%, respectively, while the theoretical values thereof are 64.4%, 3.02% and 9.39%, respectively.

Synthesis 3 (Compound No. G-21)

Bisazo compound G-21 was synthesized in the same manner as in Synthesis 1, except that 2-hydroxy-3-naphthoic anilide was replaced with equimolar 2-hydroxy-3-naphthoic acid-3'-trifluoromethyl anilide.

The elemental analysis of this compound showed that the measured values of carbon, hydrogen and nitrogen were 61.2%, 2.90% and 9.01%, respectively, while the theoretical values thereof are 62.3%, 2.81% and 8.73%, respectively.

The other exemplified compounds can be prepared in the similar manner as in the above syntheses.

The bisazo compounds of the invention have an excellent photoconductivity, and the photoreceptive layer containing the bisazo compound can be provided on a conductive support to prepare the photoreceptor of the invention.

The bisazo compounds of the invention can be used in combination with a suitable carrier transport substance to prepare a function-separating photoreceptor.

The function-separating photoreceptor may be either of a single layer type in which the two substances are contained in one layer, or of a mutilayer type in which a carrier generation substance and a carrier transport substance are incorporated into the different layers. The latter is preferred in the invention.

Figure 2:
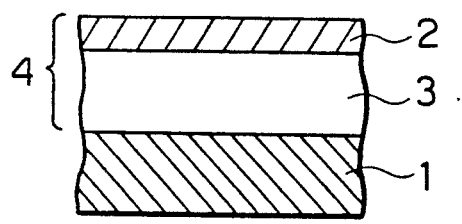
Figure 5:
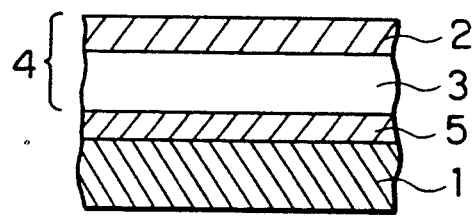
Figure 3:
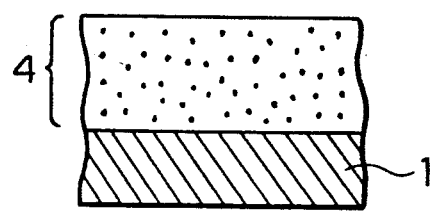
Figure 6:
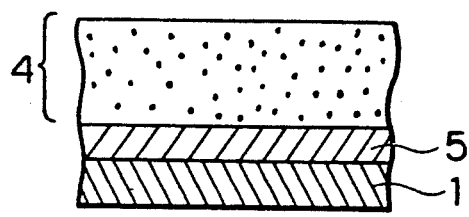

FIGS. 1 and 2 show the embodiments of the mutilayer type and FIG. 3 shows the embodiment of the single layer type.

In the multilayered photoreceptor, a carrier generation layer may contain both a carrier generation substance and a carrier transport substance.

The examples of the binder resins used in the invention are polystyrene, polyethylene, polypropylene, acrylic resin, polyamide resin, vinylchloride resin, vinylacetate resin, polyvinylbutylal resin, epoxy resin, polyurethane resin, phenol resin, polyester resin, alkyd resin, polycarbonate resin, silicone resin, and melamine resin; copolymers such as vinyl chloride-vinyl acetate-maleic anhydride copolymer; and poly-N-vinylcarbazole.

In the invention, the photoreceptive layer may contain organic amine in order to improve the carrier generation function. Secondary amine is particularly preferred.

The examples of secondary amines are dimethylamine, diethylamine, dipropylamine, dibutylamine, dihexylamine, and dipentylamine.

The addition amount of these organic amines is less than equimole, preferably 0.2 to 0.005 mol per mol of the carrier generation substance.

The photoreceptive layer may contain an antioxidant to prevent an ozonous deterioration. The examples thereof are shown below.

Group 1: Hindered phenols

Dibutylhydroxytoluene, 2,2'-methylenebis-(6-t-butyl-4-methylphenol), 4,4'-butylidenebis-(6-t-butyl-3-methylphenol), 4,4'-thiobis-(6-t-butyl-3-methylphenol), 2,2'-butylidenebis-(6-t-butyl-4-methylphenol), tocopherol, 2,2,4-trimethyl-6-hydroxy-7-t-butylchroman, pentaerythrityltetrakis-[3-(3,5-di-t-butyl-4-hydroxyphenyl)propionate], 1,6-hexandiol-bis-[3-(3,5-di-t-butyl-4-hydroxyphenyl)propionate], butylhydroxyanisole, and 1-[2-{(3,5-di-t-butyl-4-hydoxyphenyl)propionyloxy}ethyl]-4-] 3-(3, 5-di-t-butyl-4-hydroxyphenyl)propionyloxy]-2,2,6,6-tetramethylpiperidine.

Group 2: p-Phenylenediamines

N-phenyl-N'-isopropyl-p-phenylenediamine, N,N'-di-secbutyl-p-phenylenediamine, N-phenyl-N-sec-butyl-p-phenylenediamine, and N,N'-dimethyl-N,N'-di-t-butyl-p-phenylenediamine.

Group 3: Hydroquinones 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Group 4: Organic sulfur compounds

Dilauryl-3,3'-thiodipropionate, distearyl-3,3'-thiodipropionate, and ditetradecyl-3,3'-thiodipropionate.

These compounds are known as antioxidants for rubber, plastics and oil and fats, and are commercially available.

These antioxidants may be added to any of a carrier generation layer, a carrier transport layer and a protective layer, preferably to the carrier transfer layer. The addition amount thereof by weight is 0.1 to 100 parts per 100 parts of the carrier transport substance, preferably 1 to 50 parts, more preferably 5 to 25 parts.

The examples of the conductive supports are plates and drums of metals such as aluminium and nickel; plastic films laminated with metal foil or evaporation-deposited with aluminium, tin oxide or indium oxide; and papers and plastic films coated with conductive substances.

After pulverizing to a given size powder, the bisazo compound of the invention is dispersed singly or together with a binder resin in a dispersant, and then coated on a support by means of dip coating, spray coating, blade coating or roller coating.

The examples of the dispersants used for the bisazo compounds are hydrocarbons such as benzene and toluene; halogenated hydrocarbons such as methylene chloride and chloroform; ketones such as acetone and methyl ethyl ketone; esters such as ethyl acetate and butyl acetate; alcohols and derivatives thereof such as methanol, ethanol, ethylene glycol, and methyl cellosolve; ethers and acetals such as tetrahydrofuran and furfural; amines such as pyridine and diethylamine; and N,N-dimethylformamide.

Where the photoreceptor of the invention is of a multilayered structure, the weight ratio of binder : carrier generation substance : carrier transfer substance in a carrier generation layer is 0 to 100:1 to 500:0 to 500.

The less amount of the carrier generation substance than the above level lowers the sensitivity of the photoreceptor and increases the residual potential, while the more amount deteriorates the dark decay and initial potential.

The thickness of a carrier generation layer is 0.01 to 10 μm, preferably 0.1 to 5 μm.

A carrier transport layer can be formed in the same manner as in the carrier generation layer.

The examples of the carrier transport substances usable in the invention are oxazole derivatives, oxadiazole derivatives, thiazole derivatives, thiadiazole derivatives, triazole derivatives, imidazole derivatives, imidazolone derivatives, imidazolidine derivatives, bisimidazolidine derivatives, styryl compounds, hydrazone compounds, pyrazoline compounds, amine derivatives, oxazolone derivatives, benzothiazole derivatives, benzimidazole derivatives, quinazoline derivatives, benzofuran derivatives, acridine derivatives, phenazine derivatives, aminostilbene derivatives, poly-N-vinylcarbazole, poly-1-vinylpyrene, and poly-9-vinyl anthracene.

The carrier transport substances used in the invention are represented preferably by the following Formulas A, B and C:

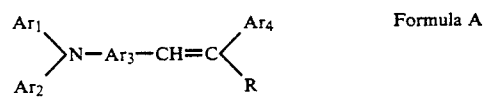

Formula A wherein $Ar_1$, $Ar_2$ and $Ar_4$ represent independently an aryl group; $Ar_3$ represents an arylene group; and R represents a hydrogen atom, an alkyl group, or an aryl group.

Examples of the above compounds are described in detail in JP O.P.I. No. 65440/1983 and 198043/1983.

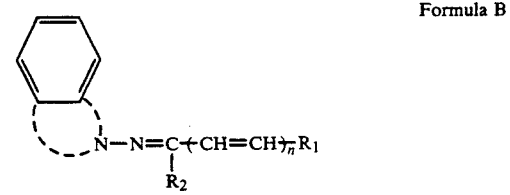

Formula B wherein $R_1$ represents an aryl or heterocyclic group; and $R_2$ represents a hydrogen atom, an alkyl group, or an aryl group.

Details on these compounds can be seen in JP O.P.I. No. 134642/1983 and 166354/1983.

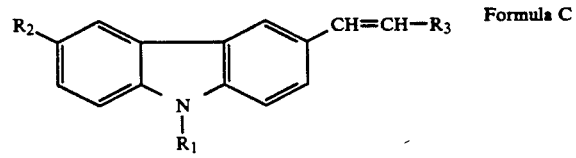

Formula C wherein $R_1$ represents an aryl group; $R_2$ represents a hydrogen, a halogen atom, a hydroxy group, an alkyl group, an alkoxy group, or an amino group; and $R_3$ represents an aryl or heterocyclic group.

The syntheses and examples of the above compounds are described in Japanese Patent Examined Publication 148750/1982.

Other preferable carrier transport substances are hydrazone compounds described in Japanese Patent Examined Publications No. 67940/1982, 101844/1982 and 15252/1984.

The amount of the carrier transport substance in the carrier transport layer is 20 to 200 parts per 100 parts by weight of a binder resin, preferably 30 to 150 parts by weight.

The thickness of the carrier transport layer is 5 to 50 μm, preferably 5 to 30 μm.

Where the photoreceptor of the invention is of a single-layered structure, the ratio of binder:bisazo compound:carrier transport substance is 0 to 100:1 to 500:0 to 500. The thickness of the photoreceptive layer is to 50 μm, preferably 5 to 30 μm.

The carrier generation layer of the invention may contain one or more kinds of electron-accepting compounds in order to improve the sensitivity of the photoreceptor and reduce the residual potential or fatigue in repeated use.

The examples thereof are succinic anhydride, maleic anhydride, phthalic anhydride, 3-nitrophthalic anhydride, pyromellitic anhydride, mellitic anhydride, tetracyanomethylene, tetracyanoquinodimethane, o-dinitrobenzene, p-nitrobenzonitrile, picryl chloride, anthraquinone, and other compounds having large electron affinity.

The addition amount therof is 0.01 to 200, preferably 0.1 to 100 parts per 100 parts by weight of the carrier generation substance.

These compounds may be added to the carrier transport layer in the amount of 0.01 to 100, preferably 0.1 to 50 parts per 100 parts by weight of the carrier transport substance.

The photoreceptor of the invention may contain a ultraviolet absorber to protect the photoreceptive layer. It may also contain a dye for color sensitivity correction.

The photoreceptor containing the bisazo compound of the invention is sensitive to visible and near infrared rays and has preferably a maximum absorption in a wavelength region of 400 to 700 nm.

The light sources having such a wavelength region are a halogen lamp, a fluorescent lamp and a tungsten lamp.

The present invention will be hereunder explained in detail by reference to the examples.

EXAMPLE 1

A 0.05 μm-thick intermediate layer comprising polyamide resin CM-4000 made by Toray Co. was provided on a conductive support comprising polyester film laminated with aluminium foil. Then, there was applied thereon the coating solution prepared by dispersing each 2 g of the bisazo compound as shown in Table 1 and polyvinylbutylal S-LEC BH-3 in 110 ml of tetrahydrofuran for 12 hours with a ball mill to form a carrier generation layer with a dry thickness of 0.5 μm. Next, the coating solution, which was prepared by dissolving 6 g of the carrier transport substance as shown in Table 1 and 10 g of polycarbonate resin Iupiron Z-200 made by Mitsubishi Gas Chemical in 80 ml of 1,2-dichloroethane, was applied on the carrier generation layer to form a carrier transport layer having a dry thickness of 18 μm.

Thus, the photoreceptor samples No. 1 to 14 were prepared.

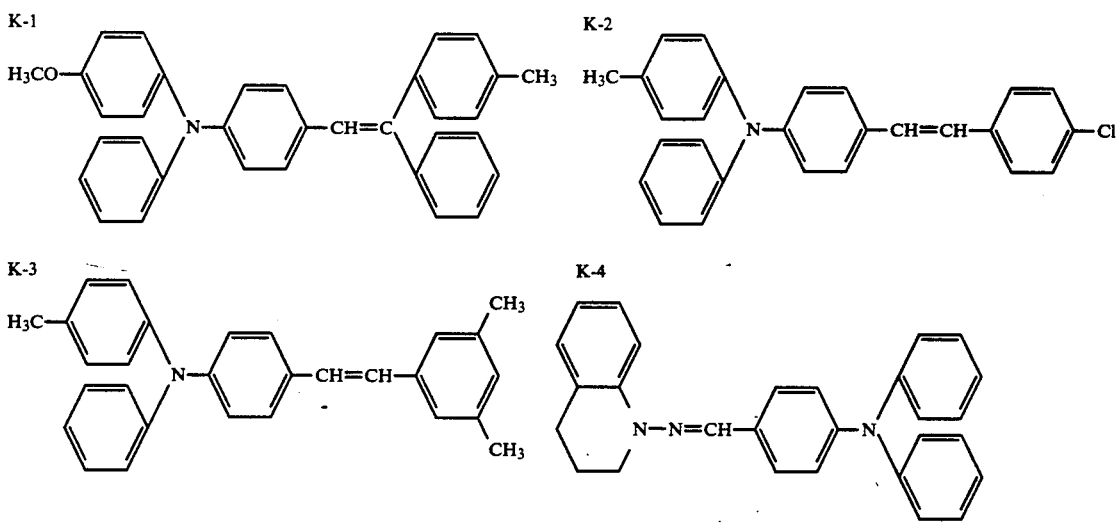

-continued

Comparative bisazo compound A-1

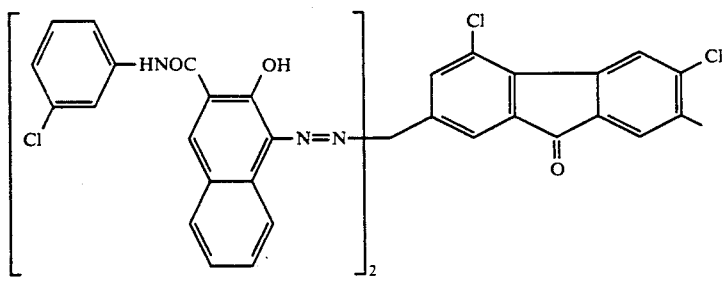

Each of the photoreceptor samples was subjected to the surface potential decay test with an electrostatic paper tester Model EPA-8100 made by Kawaguchi Denki Mfg. in the following manner:

The photoreceptor was electrified for 5 seconds at the voltage of −6 KV and then allowed to stand for 5 seconds. Subsequently, it was exposed to a halogen lamp light at the illuminance of 35 lux on the surface to determine the exposure E600/100 which is necessary to decay the surface potential from 600 V to −100 V. The results are shown in Table 1.

TABLE 1

| Sample No. | Carrier generation substance | Carrier transport substance | E600/100 (lux · sec) |
|---|---|---|---|
| 1 (Inv.) | G-1 | K-1 | 1.4 |
| 2 (Inv.) | G-6 | K-1 | 1.3 |
| 3 (Inv.) | G-8 | K-1 | 1.5 |
| 4 (Inv.) | G-11 | K-1 | 1.9 |
| 5 (Inv.) | G-15 | K-1 | 1.7 |
| 6 (Inv.) | G-21 | K-1 | 1.3 |
| 7 (Inv.) | G-29 | K-1 | 1.5 |
| 8 (Inv.) | G-33 | K-1 | 1.7 |
| 9 (Inv.) | G-41 | K-1 | 2.1 |
| 10 (Inv.) | G-45 | K-1 | 2.2 |
| 11 (Comp.) | A-1 | K-1 | 3.1 |
| 12 (Inv.) | G-2 | K-2 | 1.4 |
| 13 (Inv.) | G-17 | K-3 | 1.4 |
| 14 (Inv.) | G-28 | K-4 | 1.6 |

As apparent from the above results, the photoreceptors of the invention are notably superior to the comparative photoreceptor in sensitivity.

EXAMPLE 2

The photoreceptor samples No. 15 to 20 were prepared in the same manner as in Example 1, except that polyvinylbutylal S-LEC BH-3 was replaced with polyester resin Vyron 200 made by Toyobo and that the carrier generation and transport substances were changed as shown in Table 2.

K-5

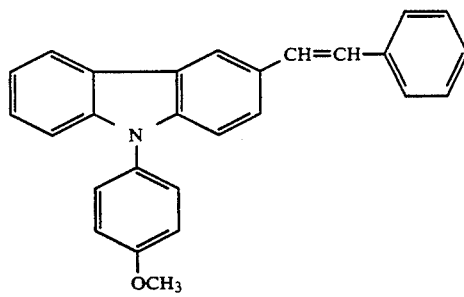

K-6

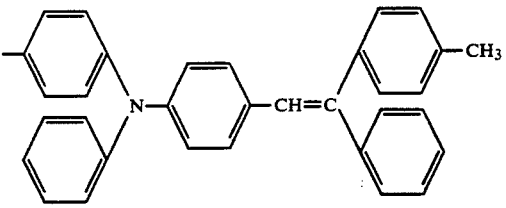

K-7

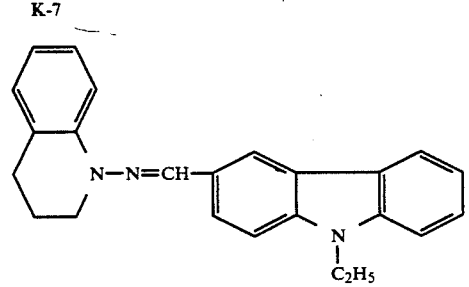

Comparative bisazo compound A-2

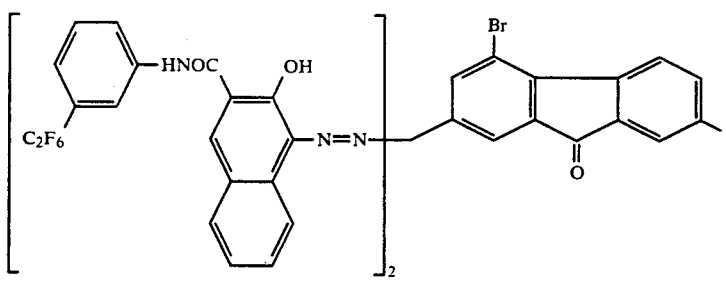

Each sample was evaluated in the same manner as in Example 1, except that the halogen lamp was replaced with a fluorescent lamp. The results are shown in Table 2.

TABLE 2

| Sample No. | Carrier generation substance | Carrier transport substance | E600/100 (lux · sec) |
| --- | --- | --- | --- |
| 15 (Inv.) | G-5 | K-5 | 1.7 |
| 16 (Inv.) | G-5 | K-6 | 1.5 |
| 17 (Inv.) | G-5 | K-7 | 1.6 |
| 18 (Comp.) | A-2 | K-5 | 2.8 |
| 19 (Comp.) | A-2 | K-6 | 2.5 |
| 20 (Comp.) | A-2 | K-7 | 3.1 |

EXAMPLE 3

A 0.05 μm-thick intermediate layer comprising polyamide resin CM-4000 made by Toray Co. was provided on an aluminium drum having a diameter of 60 mm. Then, there was applied thereon the coating solution prepared by dispersing each 2 g of the bisazo compound as shown in Table 3 and polyvinylbutylal S-LEC BH-3 in 100 ml of tetrahydrofuran for 24 hours with a ball mill to form a carrier generation layer with a dry thickness of 0.6 μm. Next, the coating solution, which was prepared by dissolving 30 g of the carrier transport substance K-1 and 50 g of polycarbonate resin Iupiron Z-200 made by Mitsubishi Gas Chemical in 400 ml of 1,2-dichloroethane, was applied on the carrier generation layer to form a carrier transport layer having a dry thickness of 18 μm.

Thus, the photoreceptor sample No. 21 was prepared.

The sample loaded in the modified machine of U-bix 1550MR made by Konica Corp. was subjected to a copying test with the result that the copied images had an excellent sharpness and a high contrast with good reproducibility even after 10,000 cycles of copying.

EXAMPLE 4

The comparative photoreceptor was prepared in the same manner as in Example 3, except that the carrier generation substance was replaced with the following comparative bisazo compound A-3. It was evaluated in the same manner as in Example 1 with the results that the copied images had much fog and that the contrast of the copied images was lowered as copying was repeated.

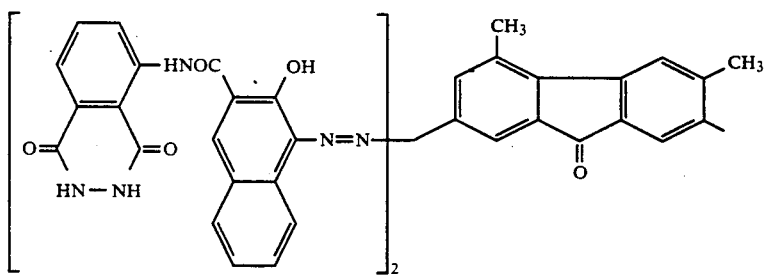

EXAMPLE 5

There was applied on a conductive support comprising polyester film laminated with aluminium foil the coating solution which was prepared by dissolving 6 g of K-3 and 10 g of polycarbonate resin Panlite L-1250 in 80 ml of 1,2-dichloroethane to form a carrier transport layer having a dry thickness of 15 μm. Then, there was applied thereon the coating solution prepared by dispersing 2 g of the bisazo compound as shown in Table 3, 1 5 g of K-3 and 2 g of polyvinylbutylal S-LEC BH-3 in 30 ml of tetrahydrofuran for 24 hours with a ball mill to form a carrier generation layer with a dry thickness of 4 μm.

Thus, the photoreceptor samples No. 21 to 24 were prepared.

Each sample was evaluated in the same manner as in Example 1, except that a positive electrification was given. The results are shown in Table 3.

TABLE 3

| Sample No. | Carrier generation substance | Carrier transport substance | E600/100 (lux · sec) |
| --- | --- | --- | --- |
| 21 (Inv.) | G-2 | K-3 | 1.9 |
| 22 (Inv.) | G-8 | K-3 | 2.0 |
| 23 (Inv.) | G-15 | K-3 | 1.8 |
| 24 (Inv.) | G-21 | K-3 | 2.2 |

What is claimed is:

1. An electrophotographic photoreceptor comprising a conductive support and provided thereon a photoreceptive layer containing a binder and a bisazo compound represented by the following Formula I:

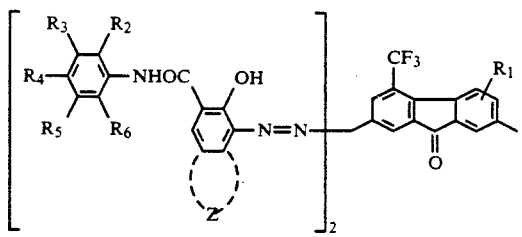

wherein $R_1$ represents a hydrogen atom, a nitro group, a cyano group, an alkyl group, or an alkoxy group; Z represents the group of non-metal atoms necessary to form an aromatic hydrocarbon ring or an aromatic heterocyclic ring by condensation with benzene ring; and $R_2$ to $R_6$ each represent a hydrogen atom, a halogen atom, a cyano group, a nitro group, an alkyl group, or an alkoxy group.

2. The photoreceptor of claim 1, wherein the aromatic hydrocarbon carbon ring formed by the non-metal atoms by condensation with the benzene ring is a naphthalene ring or an anthracene ring.

3. The photoreceptor of claim 1, wherein the aromatic heterocyclic ring formed by the non-metal atoms by condensation with the benzene ring is a carbazole ring, a benzocarbazole ring, a dibenzofuran ring, a diphenylsulfide ring, or a benzonaphthofuran ring.

4. The photoreceptor of claim 1, wherein $R_1$ is a hydrogen atom.

5. The photoreceptor of claim 1, wherein the photoreceptive layer further contains a carrier transport substance selected from the group consisting of compounds represented by the following Formulas A, B and C:

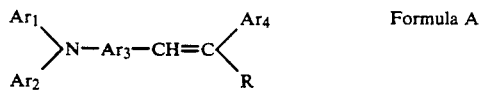

Formula A wherein $Ar_1$, $Ar_2$ and $Ar_4$ each represent an aryl group; $Ar_3$ represents an arylene group; and R represents a hydrogen atom, an alkyl group or an alkyl group,

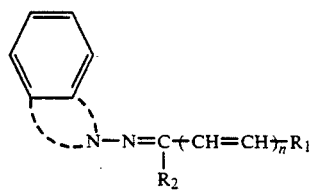

Formula B wherein $R_1$ represents an alkyl group or a heterocyclic group; and $R_2$ represents a hydrogen atom, an alkyl group or an aryl group, and

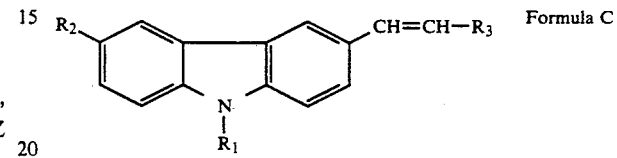

Formula C wherein $R_1$ represents an aryl group; $R_2$ represents a hydrogen atom, a halogen atom, a hydroxy group, an alkyl group, an alkoxy group, or an amino group; and $R_3$ represents an aryl group or a heterocyclic group.

6. The photoreceptor of claim 1, wherein the photoreceptive layer further contains an antioxidant selected from the group consisting of hindered phenols, para-phenylenediamines, hydrogquinones, and organic sulfur compounds.

7. The photoreceptor of claim 1, wherein the photoreceptive layer comprises a carrier generation layer containing a binder and the bisazo compound and a carrier transport layer containing a binder and a carrier transport substance.

8. The photoreceptor of claim 7, wherein the carrier generation layer further contains a carrier transport substance.

9. The photoreceptor of claim 8, wherein a weight ratio of the binder, the carrier generation substance and the carrier transport substance contained in the carrier generation layer is 0 to 100:1 to 500:0 to 500.

10. The photoreceptor of claim 7, wherein the thickness of the carrier generation layer is 0.01 to 10 μm.

11. The photoreceptor of claim 10, wherein the thickness is 0.1 to 5 μm.

12. The photoreceptor of claim 7, wherein the thickness of the carrier transport layer is 5 to 50 μm.

13. The photoreceptor of claim 12, wherein the thickness is 5 to 30 μm.

14. The photoreceptor of claim 7, wherein the thickness of the photoreceptive layer is 5 to 50 μm.

15. The photoreceptor of claim 14, wherein the thickness is 5 to 30 μm.

* * * * *

UNITED STATES PATENT AND TRADEMARK OFFICE
CERTIFICATE OF CORRECTION

PATENT NO. : 5,162,181
DATED : November 10, 1992
INVENTOR(S) : Shingo Fujimoto et al.

It is certified that error appears in the above-identified patent and that said Letters Patent is hereby corrected as shown below:

Claim 5, Column 33, Line 55, change "alkyl" (second occurence) to --aryl--; and

Claim 6, Column 34, Line 29, change "hydrogquinones" to --hydroquinones--.

Signed and Sealed this

Twenty-first Day of December, 1993

Attest:

BRUCE LEHMAN

Attesting Officer     Commissioner of Patents and Trademarks